United States Patent
Rhoads et al.

(10) Patent No.: US 7,139,408 B2
(45) Date of Patent: *Nov. 21, 2006

(54) TRANSFORM DOMAIN WATERMARKING OF IMAGE SIGNALS

(75) Inventors: Geoffrey B. Rhoads, West Linn, OR (US); Clayton L. Davidson, Lake Oswego, OR (US); Tony F. Rodriguez, Portland, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 10/953,134

(22) Filed: Sep. 28, 2004

(65) Prior Publication Data
US 2005/0036657 A1 Feb. 17, 2005

Related U.S. Application Data

(63) Continuation of application No. 09/778,307, filed on Feb. 6, 2001, now Pat. No. 6,798,894, which is a continuation of application No. 09/138,061, filed on Aug. 21, 1998, now Pat. No. 6,229,924.

(60) Provisional application No. 60/056,968, filed on Aug. 26, 1997.

(51) Int. Cl.
*H04K 1/00* (2006.01)

(52) U.S. Cl. .................................... 382/100

(58) Field of Classification Search ................ 382/100, 382/232, 248, 250, 280, 284, 287; 380/216, 380/217, 51, 54; 358/3.28; 705/50, 51; 713/176
See application file for complete search history.

(56) References Cited

U.S. PATENT DOCUMENTS 4,939,515 A 7/1990 Adelson
(Continued)

FOREIGN PATENT DOCUMENTS

DE 29 43 436 5/1981
(Continued)

OTHER PUBLICATIONS

WordPackage 8: Watermarking, pp. 1-46, Jun. 1995.*
(Continued)

*Primary Examiner*—Jose L. Couso
(74) *Attorney, Agent, or Firm*—Digimarc Corporation

(57) ABSTRACT

The invention provides methods and related systems for embedding and detecting watermarks in images, such as JPEG or MPEG formatted images as well as other types of image signals. One method receives transform coefficients of the image, and changes the value of selected coefficients to embed watermark data in the coefficients. The changing of the coefficients is controlled such that it both embeds the data and forms an orientation signal that facilitates determination of rotation or scale of the image. Another aspect of the invention is a variation of embedding a watermark in an image. This method receives message bits to be embedded in the image, receives transform coefficients of the image, and maps the message bits to selected transform coefficients. The method changes the value of selected coefficients to embed data in the coefficients. The characteristics of the image are used to control the change of transform coefficients to embed the watermark, and a bit rate control is used to modify the change of transform coefficients to embed the watermark according to a bit rate limit.

15 Claims, 4 Drawing Sheets

U.S. PATENT DOCUMENTS

| | | |
|---|---|---|
| 5,319,735 A | 6/1994 | Preuss et al. |
| 5,337,361 A | 8/1994 | Wang |
| 5,530,751 A | 6/1996 | Morris |
| 5,530,759 A | 6/1996 | Braudaway et al. |
| 5,613,004 A | 3/1997 | Cooperman et al. |
| 5,636,292 A | 6/1997 | Rhoads |
| 5,646,997 A | 7/1997 | Barton |
| 5,652,626 A | 7/1997 | Kawakami et al. |
| 5,659,726 A | 8/1997 | Sandford, II et al. |
| 5,663,766 A | 9/1997 | Sizer |
| 5,664,018 A | 9/1997 | Leighton |
| 5,668,898 A | 9/1997 | Tatsuta |
| 5,687,191 A | 11/1997 | Lee et al. |
| 5,687,236 A | 11/1997 | Moskowitz et al. |
| 5,710,834 A | 1/1998 | Rhoads |
| 5,721,788 A | 2/1998 | Powell |
| 5,727,092 A * | 3/1998 | Sandford et al. ........... 382/251 |
| 5,748,783 A * | 5/1998 | Rhoads ...................... 382/232 |
| 5,768,426 A | 6/1998 | Rhoads |
| 5,778,102 A * | 7/1998 | Sandford et al. ........... 382/251 |
| 5,799,092 A | 8/1998 | Kristol et al. |
| 5,809,139 A | 9/1998 | Girod et al. |
| 5,832,119 A | 11/1998 | Rhoads |
| 5,835,639 A | 11/1998 | Honsinger et al. |
| 5,841,886 A | 11/1998 | Rhoads |
| 5,848,155 A | 12/1998 | Cox et al. |
| 5,857,038 A | 1/1999 | Owada et al. |
| 5,859,920 A | 1/1999 | Daly et al. |
| 5,862,260 A | 1/1999 | Rhoads |
| 5,901,178 A | 5/1999 | Lee et al. |
| 5,903,892 A | 5/1999 | Hoffert |
| 5,905,819 A | 5/1999 | Daly |
| 5,915,027 A * | 6/1999 | Cox et al. ..................... 380/54 |
| 5,930,369 A | 7/1999 | Cox |
| 5,933,798 A | 8/1999 | Linnartz |
| 5,946,414 A * | 8/1999 | Cass et al. .................. 382/183 |
| 5,949,055 A | 9/1999 | Fleet et al. |
| 5,949,885 A | 9/1999 | Leighton |
| 5,956,716 A | 9/1999 | Kenner |
| 5,960,081 A | 9/1999 | Vynne |
| 5,983,176 A | 11/1999 | Hoffert |
| 5,987,459 A | 11/1999 | Swanson |
| 6,018,593 A | 1/2000 | Yamagata |
| 6,031,914 A | 2/2000 | Tewfik et al. |
| 6,037,984 A | 3/2000 | Isnardi |
| 6,061,451 A | 5/2000 | Muratani |
| 6,061,793 A | 5/2000 | Tewfik |
| 6,069,914 A | 5/2000 | Cox |
| 6,094,722 A | 7/2000 | Astola |
| 6,104,826 A | 8/2000 | Nakagawa |
| 6,108,434 A | 8/2000 | Cox |
| 6,122,403 A | 9/2000 | Rhoads |
| 6,181,813 B1 | 1/2001 | Fan |
| 6,208,745 B1 | 3/2001 | Florencio et al. |
| 6,229,924 B1 * | 5/2001 | Rhoads et al. .............. 382/232 |
| 6,266,419 B1 | 7/2001 | Lacy et al. |
| 6,266,430 B1 | 7/2001 | Rhoads |
| 6,285,776 B1 | 9/2001 | Rhoads |
| 6,314,192 B1 | 11/2001 | Chen |
| 6,332,030 B1 * | 12/2001 | Manjunath et al. ......... 382/100 |
| 6,343,138 B1 | 1/2002 | Rhoads |
| 6,345,104 B1 | 2/2002 | Rhoads |
| 6,359,985 B1 | 3/2002 | Koch et al. |
| 6,373,965 B1 | 4/2002 | Liang |
| 6,385,329 B1 | 5/2002 | Sharma et al. |
| 6,385,330 B1 | 5/2002 | Powell et al. |
| 6,408,082 B1 | 6/2002 | Rhoads et al. |
| 6,411,392 B1 | 6/2002 | Bender et al. |
| 6,424,725 B1 | 7/2002 | Rhoads et al. |
| 6,424,726 B1 | 7/2002 | Nakano et al. |
| 6,483,927 B1 | 11/2002 | Brunk et al. |
| 6,522,771 B1 | 2/2003 | Rhoads |
| 6,567,533 B1 | 5/2003 | Rhoads |
| 6,580,808 B1 | 6/2003 | Rhoads |
| 6,580,819 B1 * | 6/2003 | Rhoads ...................... 382/135 |
| 6,608,919 B1 | 8/2003 | Alattar |
| 6,614,914 B1 | 9/2003 | Rhoads et al. |
| 6,625,297 B1 | 9/2003 | Bradley |
| 6,647,128 B1 | 11/2003 | Rhoads |
| 6,754,377 B1 | 6/2004 | Rhoads |
| 6,798,894 B1 | 9/2004 | Rhoads |
| 6,959,098 B1 | 10/2005 | Alattar |
| 6,973,197 B1 | 12/2005 | Miller |
| 6,975,744 B1 | 12/2005 | Sharma et al. |
| 6,993,153 B1 | 1/2006 | Bradley |
| 2001/0019611 A1 | 9/2001 | Hilton |

FOREIGN PATENT DOCUMENTS

| | | |
|---|---|---|
| EP | 0824821 | 2/1998 |
| JP | 3-185585 | 8/1991 |
| WO | WO9827510 | 6/1998 |
| WO | WO02060182 | 8/2003 |

OTHER PUBLICATIONS

"Access Control and COpyright Protection for Images, WorkPackage 8: Watermarking," Jun. 30, 1995, 46 pages.

Bender, "Techniques for Data Hiding," SPIE vol. 2420, pp. 164-173, 1995.

Bors et al., "Image Watermarking Using DCT Domain Constraints," Proc. IEEE Int. Conf. on Image Processing, vol. 3, Sep., 1996, pp. 231-234.

Brassil et al., "Electronic Marking and Identification Techniques to Discourage Document Copying", Proceedings of INFOCOM '94 Conference on Computer, IEEE Commun. Soc Conference, Jun. 12-16, 1994, pp. 1278-1287.

Burgett et al., "A Novel Method for Copyright Labeling Digitized Image Data," Sep. 1994, 12 pages.

Dittmann, Jana et al., "Robust MPEG Video Watermarking Technologies", ACM Multimedia '98, Bristol, UK, 1998, pp. 71-80.

Hartung et al., Digital Watermarking of Raw and Compressed Video, Proc. SPIE 2952, Digital Compression Technologies and Systems for Video Communications, Oct. 1996, pp. 205-213.

Highwater FBI, "Copyright Protection for Digital Images, Digital Fingerprinting from FBI," Brochure, 4 pgs. 1995.

Holliman et al., "Adaptive Public Watermarking of DCT-Based Compressed Images," SPIE vol. 3312, Dec. 1997, pp. 284-295.

JPEG Group's JPEG Software (release 4), FTP.CSUA.Berekeley.EDU/PUB/Cypherpunks/Applications/JSTEG/JPEG. Announcement.GZ, Jun. 1993, 2 pages.

Kawaguchi et al., "Principle and Applications of BPCS-Steganography," Proc. SPIE vol. 3528: Multimedia Systems and Applications, Nov. 2-4, 1998, pp. 464-473.

Koch et al., "Copyright Protection for Multimedia Data," Proc. Of the Int. Conf. On Digital Media and Electronic Publishing, Leeds, U.K., Dec., 1994, 15 pages.

Komatsu et al., "A Proposal on Digital Watermark in Document Image Communication and Its Application to Realizing a Signature," Electronics and Communications in Japan, Part 1, vol. 73, No. 5, 1990, pp. 22-33.

Komatsu et al., "Authentication System Using Concealed Image in Telematics," Memoirs of the School of Science & Engineering, Waseda Univ., No. 52, 1988, pp. 45-60.

Langelaar et al., "Robust Labeling Methods for Copy Protection of Images," Proc. SPIE Electronic Imaging '97: Storage and Retrieval of Image and Video Databases V, Feb. 1997, pp. 298-309.

Langelaar et al., "Copy Protection for Multimedia Data based on Labeling Techniques," Jun. 1996, 9 pages.

Langelaar et al., "Watermarking by DCT Coefficient Removal: A Statistical Approach to Optimal Parameter Settings," SPIE vol. 3657, Jan. 1999, pp. 2-13.

Matsui et al., "Video-Steganography: How to Secretly Embed a Signature in a Picture," IMA Intellectual Property Project Proceedings, Jan. 1994, vol. 1, Issue 1, pp. 187-205.

Ogihara et al, "Data Embedding into Pictorial Images with Less Distortion Using Discrete Cosine Transform," Proceedings of ICPR 96, IEEE, pp. 675-679.

O'Ruanaidh, "Rotation, Scale and Translation Invariant Digital Image Watermarking," Signal Processing, pp. 2-15, May 1, 1998.

O'Runanaidh, "Rotation, Scale and Translation Invariant Digital Image Watermarking," 1997 IEEE, pp. 536-539.

Sheng, "Experiments on Pattern Recognition Using Invariant Fourier-Mellin Descriptors," Journal of Optical Society of America, vol. 3, No. 6, pp. 771-776, 1986.

Szepanski, "A Signal Theoretic Method For Creating Forgery-Proof Documents For Automatic Verification", 1979 Carnahan Conference on Crime Countermeasures, University of Kentucky, Lexington, Kentucky, May 16-18, 1979.

Tanaka, "Embedding the Attribute Information Into a Dithered Image," Systems and Computers in Japan, vol. 21, No. 7, 1990, pp. 43-50.

Tanaka et al., Embedding Secret Information Into a Dithered Multi-Level Image, 1990 IEEE, pp. 216-220.

van Schyndel et al., "A Digital Watermark," IEEE International Conference on Image Processing, Nov. 13, 1994 pp. 86-90.

* cited by examiner

TRANSFORM DOMAIN WATERMARKING OF IMAGE SIGNALS

RELATED APPLICATION DATA

This application is a continuation of application Ser. No. 09/778,307, filed Feb. 6, 2001 (Now U.S. Pat. No. 6,798,894), which is a continuation of application Ser. No. 09/138,061, filed Aug. 21, 1998 (Now U.S. Pat. No. 6,229,924), which claims the benefit of patent application Ser. No. 60/056,968, which was filed on Aug. 26, 1997. These prior patents and patent applications are hereby incorporated by reference.

TECHNICAL FIELD

The invention relates to digital watermarking.

BACKGROUND AND SUMMARY

The advent of technology for storing images on digital media has increased the need for a method to protect against piracy. Images stored on prior forms of media (e.g. VHS, Beta, audiotapes, etc.) are inherently degraded when copied. Images stored on digitally encoded media can be copied with no degradation; therefore, perfect copies of copies of copies, etc. can be made.

The introduction of Digital Versatile Discs (DVD) containing movies has created increased incentives for both casual and professional unauthorized copying. At the movie industry's urging, technology has been put in place to protect against simple duplication of DVD disks using equipment available to unsophisticated consumers. This is similar to the protection that exists which prevents one from duplicating a VCR tape by connecting together two commercially available VCRs.

While such protection mechanisms protect against some types of copying, a personal computer connected to a DVD device present a much more complicated problem. Open architecture devices such as personal computers reproduce the signals in the "clear" and such devices have many entry points, which can be used to duplicate material once it is in the "clear". Some embodiments of the invention use digital watermarks to address the above described problem. The invention also has other applications.

The invention provides methods and related systems for embedding and detecting watermarks in images, such as JPEG or MPEG formatted images as well as other types of image signals. One method receives transform coefficients of the image, and changes the value of selected coefficients to embed watermark data in the coefficients. The changing of the coefficients is controlled such that it both embeds the data and forms an orientation signal that facilitates determination of rotation or scale of the image.

For example, to facilitate the detection of digital watermarks, one can insert a watermark signal that forms an orientation signal called a grid. The grid can be used to determine orientation and scale. In one embodiment described in this document, the data signal and the grid signal are integrated into a single watermark signal in such a manner that the visual artifacts introduced by the watermark are minimized.

Another aspect of the invention is a variation of embedding a watermark in an image. This method receives message bits to be embedded in the image, receives transform coefficients of the image, and maps the message bits to selected transform coefficients. The method changes the value of selected coefficients to embed data in the coefficients. The characteristics of the image are used to control the change of transform coefficients to embed the watermark, and a bit rate control is used to modify the change of transform coefficients to embed the watermark according to a bit rate limit.

In applications such as DVD storage of content, an important factor that needs be considered is the bit rate of the bit stream. There are disadvantages if introduction of a watermark into a bit stream changes the bit rate. For example if images are going to be recorded on a medium such as a DVD disc, increasing the number of bits in the bit stream will decrease the number of images that can be recorded on a single disk. It is known that, in general, adding a watermark to a stream of images will increase the number of bits in the bit stream. An embodiment provides a method and apparatus, which preserves the bit rate even though watermarks are introduced into the images.

JPEG and MPEG data compression techniques transform images utilizing a discrete cosine transform (DCT) which produces a matrix of DCT coefficients. These coefficients are arranged into blocks (e.g., into 8 by 8 blocks of coefficients). The blocks of DCT coefficients are in turn arranged into macro blocks (e.g., into 16 by 16 arrays containing four 8 by 8 blocks). In one embodiment of a digital watermark encoder, selected DCT coefficients in each block are slightly increased or slightly decreased in response to a watermark signal. The changes in the blocks that comprise each macro block are done in a coordinated manner so that the phase of the watermark signal is preserved across the block boundaries. By preserving the phase across block boundaries, a detectable grid is formed which can be used as an orientation and scaling grid.

An embodiment of the watermark encoder also maintains the bit rate of the image signal. The bit rate of the signal is preserved by maintaining a count (referred to as the cumulative change count) that represents the amount that the bit rate has been increased by changes in coefficients less the amount that the bit rate has been decreased by changes in the coefficients. If at any time the cumulative change count exceeds a pre-established limit, coefficient changes that decrease the cumulative change count continue; however, coefficient changes that increase the cumulative change count are suspended. The suspension of coefficient changes that increase the cumulative change count continues until the cumulative change count falls below the pre-established limit. The above described process can be described as selectively changing the intensity of a watermark signal in a bit stream so as to prevent the entropy of the combined signal from exceeding a pre-established limit.

Further features will become apparent with reference to the following detailed description and accompanying drawings.

DETAILED DESCRIPTION

The MPEG (Motion Picture Expert Group) and JPEG (Joint Photographic Expert Group) image compression techniques use a DCT (Discrete Cosine Transform) to generate a matrix of coefficients. An embodiment of the invention shown herein slightly modifies the DCT coefficients (either slightly increases or slightly decreases the value of the coefficients) so as to embed a digital watermark in the image. Such a digital watermark can later be detected by cross correlation techniques.

Figure 1:
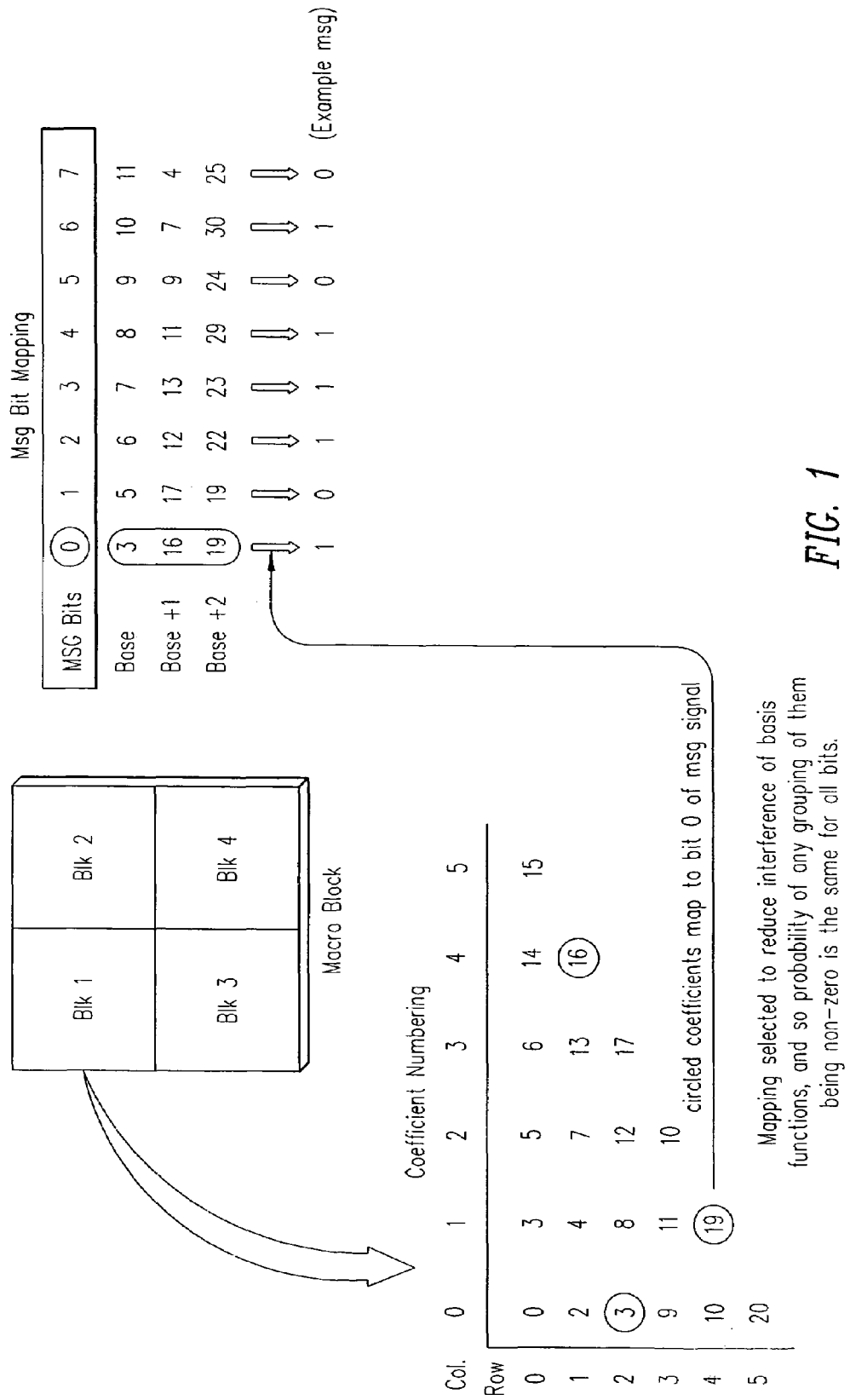
FIG. 1 is a diagram illustrating how the pixels in an image are arranged into blocks and how the resulting DCT coefficients are numbered.
Figure 2:
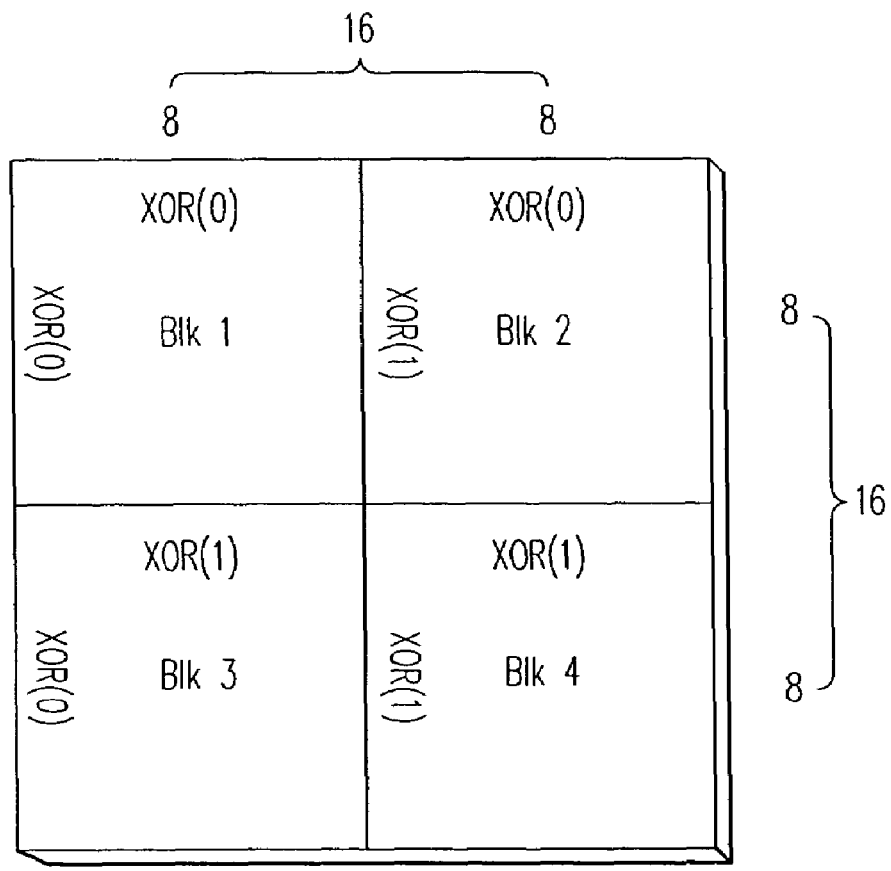
FIG. 2 is a diagram, which shows how the blocks of DCT coefficients are arranged into macro blocks.

As illustrated in FIG. 1, the MPEG and JPEG techniques divide an image into 8 by 8 blocks of pixels. Each block of pixels is then used to generate an eight by eight block of DCT coefficients. The 8 by 8 blocks of coefficients are divided into "macro blocks", each of which consists of four of the original blocks. This is illustrated in FIG. 2. The rows and columns of DCT coefficients in each block are numbered from top to bottom and left to right as illustrated in FIG. 1. The first row and the first column are designated as the "0" row and "0" column.

Certain of the DCT coefficients in each block are selected as the coefficients that will carry a selected bit of the digital watermark signal. In one embodiment, the three coefficients circled in FIG. 1 are used to carry the first or "0" bit of the watermark data signal. These three coefficients are modified, that is, either slightly increased or slightly decreased depending upon the value of the "0" bit of the watermark data. In a similar manner, other coefficients are slightly changed in order to carry the other bits of the watermark signal.

One aspect of the embodiment is directed to insuring that the sinusoids generated by the changes made to the DCT coefficients are continuous, that is, in-phase across the four blocks that constitute each macro block. First, if the sinusoids that carry the watermark are continuous across each macro block, there will be less edge effects and the watermark will be less visually noticeable. Second, the sinusoids which are continuous over the four blocks of each macro block create a low level orientation or grid signal. This low level grid signal can be detected to determine the orientation and scale of the watermark. The grid signal can then be detected using cross correlation techniques. Cross correlation detection techniques are for example shown in co-pending patent application Ser. No. 08/649,149 filed May 16, 1996 (Now U.S. Pat. No. 5,862,260) and in issued patent U.S. Pat. Nos. 5,748,763 and 5,748,783.

If certain DCT coefficients in adjacent blocks are modified in the same direction, the resulting sinusoids will not be continuous across block boundaries. In the embodiment, the changes made to the coefficients of each of the four blocks in a macro block are coordinated so that the resulting sinusoids will be continuous across block boundaries within each macro block. The changes are coordinated using the rules explained below.

The blocks in each macro block are numbered as shown in FIG. 2. Block one is considered the base block. The coefficients in this block are changed in a conventional way by the associated bits of the watermark signal. Note, the following paragraphs relate to how the coefficients which are circled in FIG. 1 are changed in response to the "0" bit of the watermark. It should be understood that other coefficients must be similarly changed to carry the other bits in the watermark data.

In block 1, the coefficients that are circled in FIG. 1 are slightly increased or slightly decreased in response to the "0" bit of the watermark data. In blocks 2, 3 and 4, the circled coefficients shown in FIG. 1 are changed in response to the zero bit of the watermark according to the following rules.

Block 2: invert the direction of the change if the coefficient is in an odd row.

Block 3: invert the direction of the change if the coefficient is in an odd column Block 4: invert the direction of the change if the coefficient is in an odd row or if it is in and odd column, but do not invert the direction of the change if the coefficient is in both and odd row and in an odd column.

If the above rules are followed the sinusoids generated by the change in the DCT coefficients will be continuous across the boundaries in the four blocks that form each macro block. These sinusoids will be able to be detected using cross correlation techniques, and they can be used as a grid to determine the scale and rotation of the image. The data bits in the watermark will also be able to be detected using conventional watermark detection techniques. Thus, the watermark data itself is used to form the grid that can be used to determine scale and rotation.

Figure 3:
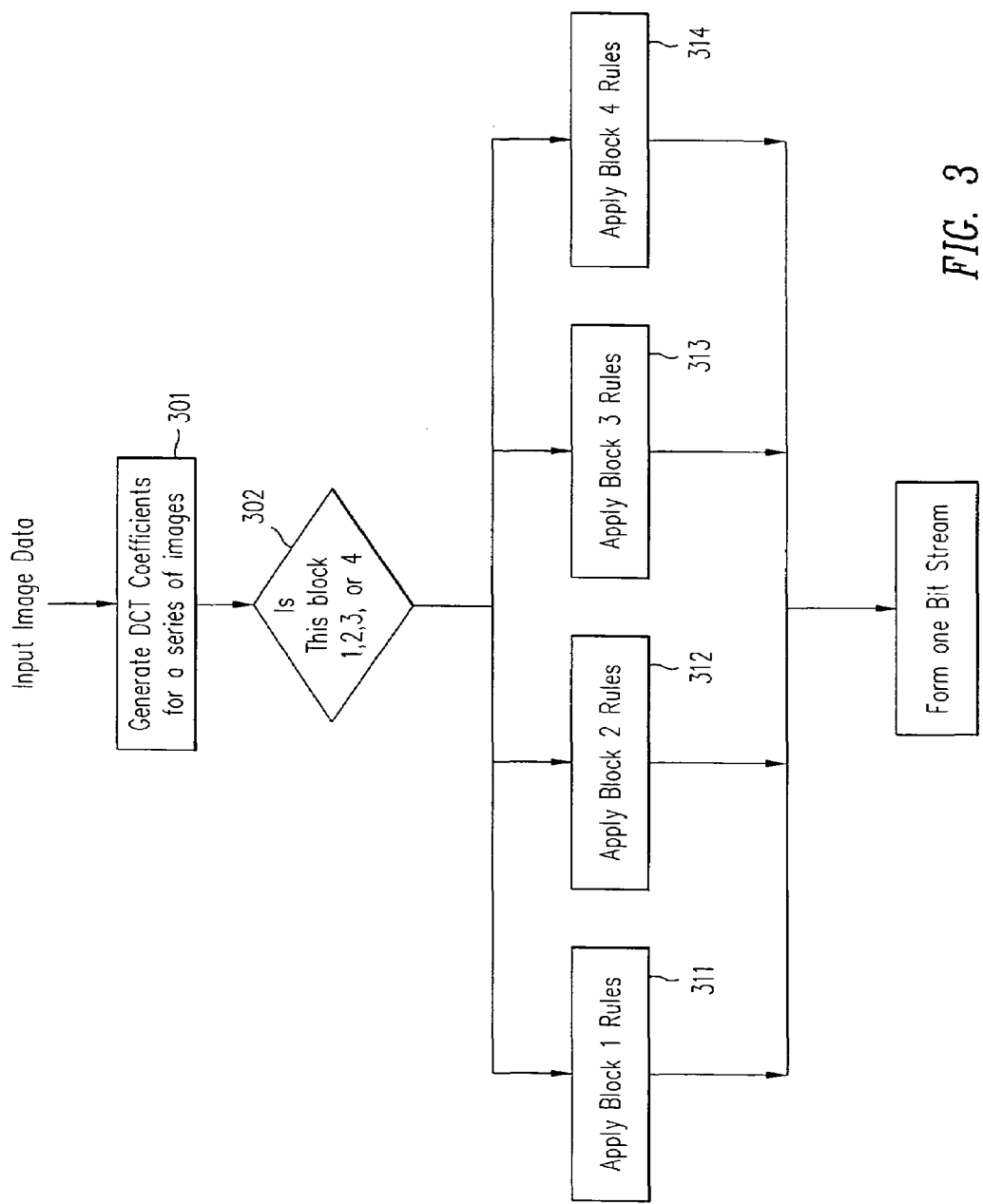
FIG. 3 is a program flow diagram showing how the coefficients in each block of a macro block are treated so as to preserve the phase of watermark signal in each macro block.

FIG. 3 is an overall program flow diagram of the above described aspect of an embodiment. The system accepts a stream of data that represents images. Block 301 is a conventional device or program module that generates DCT coefficients for the images in the data stream. These coefficients are sent to a decision unit 302 which separates the data into macro blocks and sends it to units 311, 312, 313 and 314 depending upon whether the data represents a block 1, 2, 3 or 4 in a macro block. Units 311–313 modify the DCT coefficients in order to imbed a watermark signal according to the following rules.

Unit 311: modify the coefficients in a conventional manner to imbed watermark.

Unit 312: invert the direction of the change if the coefficient is in an odd row.

Unit 313: invert the direction of the change if the coefficient is in an odd column Unit 314: invert the direction of the change if the coefficient is in an odd row or if it is in and odd column, but do not invert the direction of the change if the coefficient is in both and odd row and in an odd column.

The output of units 322 to 314 is combined by unit 320 back into a single data stream. It is noted that each of the units shown in FIG. 3 could be separate units, which are either programmed, or hardwired to perform the specified functions. Alternatively, all of the functions could be performed in a single programmed computer on a time-shared basis. The unit which generates DCT coefficients is conventional and such units are known.

The previous discussion describes how a watermark can be introduced in the DCT domain. It is noted that the durability of the overall watermarking can be increased by using two watermarks. One watermark can be added by modification of the pixels in the original image in the manner as described in U.S. Pat. Nos. 5,748,763 or 5,748,783 and then a second watermark can be added by modification of the coefficients in the DCT domain as described herein.

Another problem addressed by the present invention is the need to maintain a constant bit rate in a stream of bits representing a series of images even though watermarks are added to the images. It is noted that MPEG and JPEG systems use variable length codes to represent data; hence, adding watermarks generally increases the bit rate of a data stream. In some watermarking systems, a watermark has no correlation with the image into which the watermark is embedded. Thus, embedding a watermark in an image produces an image which has higher entropy than the original image. The bit rate of a data stream transmitting an image correlates directly to the entropy of the image.

Typically the number of codes used to code an image, that is, the number of entries in the Huffman table of a coded image, is relatively large (e.g., 500). However, the changes that occur when a watermark is introduced into an image can be illustrated with following simple example. Consider a data stream that has only four symbols, s1, s2, s3 and s4, which are encoded as follows:

| Symbol | code |
|--------|------|
| s1 | 0 |
| S2 | 01 |
| S3 | 110 |
| S4 | 111 |

Then consider a data stream as follows:

| Bit stream: | 0011010111010 |
| Decoded stream | 0/0/110/10/111/0/10 |
| Decoded message: | s1, s2, s3, s2, s4, s1, s2 |

When a watermark is added to an image the bits in the image are slightly changed. In the above simplistic illustrative example, in some situation the symbol s2 would be changed to the symbol s3 and hence the number of bits in a bit stream which transmits the image would be increased. In fact, there are mathematical principles (not explained herein) which show that when a normally distributed watermark (that is, a watermark with a Gaussian distribution) is added to an image, and the image is transmitted using variable length Huffman codes, the length of the bit stream will of necessity be increased.

One embodiment of the encoder uses a technique for insuring that when a watermark is added to a data stream, the bit rate will be maintained constant. It is noted that the embodiment does not violate the above-described mathematical principle because some of the redundancy normally used to watermark images is in certain circumstances decreased. That is, in certain circumstances the intensity of the watermark is decreased.

In the embodiment, the watermark is modified in response to characteristics of the image. Thus, to some extent the watermark is correlated to the image into which the watermark in embedded. In this way, a watermark can be embedded into an image and the entropy of the combined image and watermark will be substantially equal to the entropy of the watermark alone.

In the embodiment, the encoder system maintains a cumulative count of the amount that the coefficients have been changed to any point in time. That is, the amount of positive changes less the amount of negative changes made since the beginning of the bit stream is tracked. This amount is herein referred to as the cumulative change count. If at any time, the cumulative change count exceeds a pre-established positive limit, no further positive changes are made.

Normally, it is only necessary to insure that changes do not increase the bit rate unduly; however, in some instances it may also be desirable to insure that changes do not unduly decrease the bit rate. If this is desired, the same technique as described above can be used to insure that the cumulative change amount does not exceed a pre-established negative limit. That is, if the cumulative change amount exceeds a pre-established negative value, positive changes continue in a normal manner, but no further negative changes are made.

The magnitude of the pre-established maximum (and in both a positive and negative direction) are established at the values which constitutes the change in bit rate which can be tolerated in a particular system.

Figure 4:
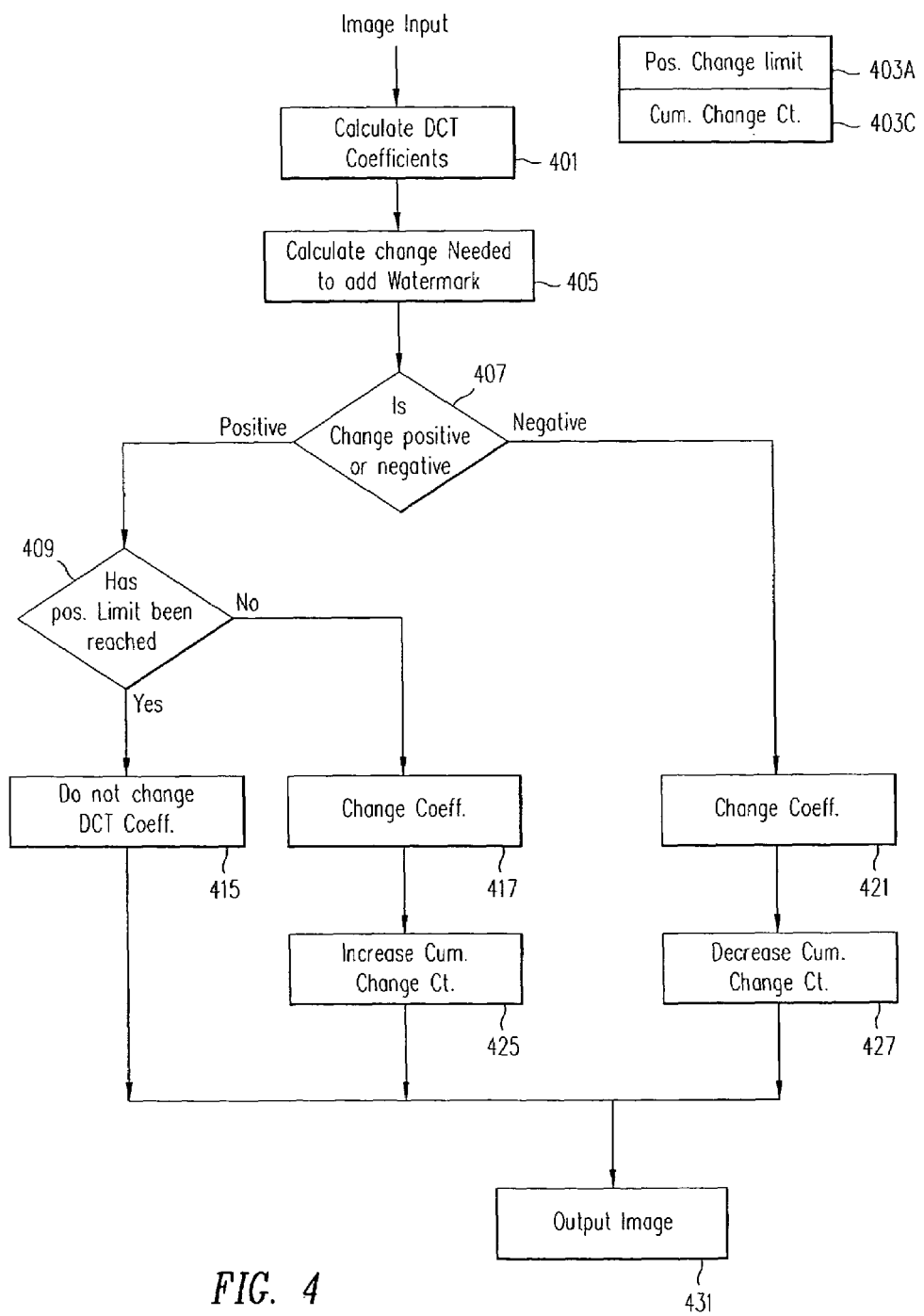
FIG. 4 is a program flow diagram showing how the bit rate in the data stream is maintained constant.

FIG. 4 is a program flow diagram showing how the data rate is maintained constant not withstanding the fact that watermarks are added to the images in the data stream. Block 403A shows that a limit on the amount of positive changes that can be made to DCT coefficients is established and stored. Blocks 403C shows that the cumulative change amount is stored. The cumulative change amount is the amount of positive changes less the amount of negative changes that have been made to coefficients since the start of the data stream.

The DCT coefficients are calculated in the normal manner as indicated by block 401. Likewise the change in each the DCT coefficients needed to embed the watermark is also calculated in the normal manner as shown by block 405. Block 405 shows that a check is made to determine if the needed change in a particular DCT coefficient is positive or negative. Block 409 indicates that if the change is positive a check is made to determine if the maximum allowable cumulative change amount stored in block 403A will be exceeded if the change is made.

Blocks 415, and 417 indicate that the coefficients will only be changed, if the change does not cause the cumulative change amount to exceed the limit in 403A. Finally as indicated by blocks 425 and 427, the cumulative change amount in register 403C is incremented or decremented if a change to the coefficients is in fact made. Block 431 indicates that the coefficients are sent to the output of this process and they are then transmitted and processed in a normal manner.

It is noted that this embodiment relates to embedding a watermark in an image. Various know techniques can be used to detect watermarks embedded in images utilizing this approach. For example techniques such as those described in U.S. Pat. Nos. 5,748,763, and 5,748,783 or in the "Communications of the ACM" July 1998/vol 41, No. 7 or in pending U.S. application Ser. No. 08/746,613 filed Nov. 12, 1996 (Now U.S. Pat. No. 6,122,403) and Ser. No. 08/649,419 which was filed May 16, 1996 (Now U.S. Pat. No. 5,862,260) (all of which are hereby incorporated herein by reference) could be used.

While the process has been described above as one where a change is either made or not made, it should be understood that alternatively, the amount of the change could be decreased if the limit in the cumulative change value is being approached. It is also noted that the system shown in FIG. 4 prevents the cumulative change value from exceeding a pre established positive limit. Since adding a watermark to an image generally increases the entropy of the image and since Huffman code tables are normally constructed such that an increase in entropy result in increased bit rate, the use of only a positive limit is normally appropriate. However, in some situations, it may be appropriate to track if the cumulative change amount exceeds a limit in both the positive and negative directions. Such a check could be added to FIG. 4 prior to block 427.

It is recognized that by implementing the described embodiment, the strength of the watermark is in some cases reduced. However, the reduction is not sufficient to prevent detection of the watermark. The changes made with the above embodiment merely lower the intensity of the watermark in a selective manner. Thus, in some instances, more processing may be required to detect the watermark.

In many systems, each Huffman code covers several symbols. In such systems the calculation indicated by block 405 is not the change in a single symbol that results from adding a watermark to the image. In such systems the calculation indicated by block 405 is a calculation of the change that results in the bit string of whatever combination of symbols used in the Huffman code to represent a symbol. In some cases the calculation might have to be done over several combinations of symbols.

It is also noted that various aspects of the present invention are shown herein in a single embodiment. Other alternative embodiments could use one but not all aspects of the invention. For example, the part that relates to maintaining bit rate could be used in embodiments which do not use macro blocks to establish an orientation grid. Likewise the aspect which relates to the use of macro blocks could be used without the part that relates to maintaining a constant bit rate. Finally, while the invention has been shown in an embodiment that inserts a watermark in the DCT domain, the invention could be used in applications where watermarks are inserted in other domains.

While the invention has been shown and described with respect to preferred embodiments of the invention, various changes in form and detail could be made without departing from the spirit and scope of the invention. The applicant's invention is limited only by the appended claims.

We claim:

1. A method of embedding a watermark in an image comprising:
   receiving transform coefficients of the image;
   changing the value of selected coefficients to embed multi-bit message data in the coefficients, the changing including controlling the changing of the coefficients such that the changing embeds the data and forms an orientation signal that facilitates determination of rotation or scale of the image.

2. The method of claim 1 wherein the transform coefficients comprise Discrete Cosine Transform coefficients.

3. The method of claim 1 wherein the transform coefficients are extracted from compressed image blocks.

4. The method of claim 1 wherein the data comprises message bits, and a message bit is mapped to selected transform coefficients.

5. The method of claim 4 wherein the change of the selected transform coefficients to embed the watermark is modified by a characteristic of the image.

6. The method of claim 4 wherein the change of the selected transform coefficients to embed the watermark is modified to control bit rate of the image according to a bit rate limit.

7. The method of claim 1 wherein the orientation signal is formed by embedding message bits according to an embedding rule.

8. The method of claim 1 wherein the transform coefficients form part of a video.

9. A method of embedding a watermark in an image comprising:
   receiving message bits to be embedded in the image;
   receiving transform coefficients of the image;
   mapping the message bits to selected transform coefficients;
   changing the value of selected coefficients to embed data in the coefficients; wherein characteristics of the image are used to control the change of transform coefficients to embed the watermark, and a bit rate control is used to modify the change of transform coefficients to embed the watermark according to a bit rate limit.

10. The method of claim 9 wherein each of the message bits are mapped to selected transform coefficients.

11. The method of claim 10 wherein the image comprises at least part of an MPEG video.

12. A computer readable medium on which is stored instructions for performing a method of embedding a watermark in an image, the method comprising:
    receiving transform coefficients of the image;
    changing the value of selected coefficients to embed multi-bit message data in the coefficients, the changing including controlling the changing of the coefficients such that the changing embeds the data and forms an orientation signal that facilitates determination of rotation or scale of the image.

13. The computer readable medium of claim 12 wherein the transform coefficients form part of a video.

14. A computer readable medium on which is stored instructions for performing a method of embedding a watermark in an image, the method comprising:
    receiving message bits to be embedded in the image;
    receiving transform coefficients of the image;
    mapping the message bits to selected transform coefficients;
    changing the value of selected coefficients to embed data in the coefficients; wherein characteristics of the image are used to control the change of transform coefficients to embed the watermark, and a bit rate control is used to modify the change of transform coefficients to embed the watermark according to a bit rate limit.

15. The computer readable medium of claim 14 wherein the transform coefficients form part of a video.

* * * * *

UNITED STATES PATENT AND TRADEMARK OFFICE
CERTIFICATE OF CORRECTION

PATENT NO. : 7,139,408 B2  
APPLICATION NO. : 10/953134  
DATED : November 21, 2006  
INVENTOR(S) : Geoffrey B. Rhoads, Clay Davidson and Anthony Rodriguez Page 1 of 1

It is certified that error appears in the above-identified patent and that said Letters Patent is hereby corrected as shown below:

ON THE TITLE PAGE;

Item 75, Inventors: Lines 2 and 3,

Delete "Clayton L. Davidson" and replace with -- Clay Davidson --

Delete "Tony F. Rodriguez" and replace with -- Anthony Rodriguez --

Signed and Sealed this

Fourteenth Day of June, 2011

David J. Kappos
*Director of the United States Patent and Trademark Office*